(12) United States Patent
Zhao et al.

(10) Patent No.: US 12,205,178 B2
(45) Date of Patent: Jan. 21, 2025

(54) METHOD AND APPARATUS FOR GROUP MANAGEMENT, ELECTRONIC DEVICE, AND STORAGE MEDIUM

(71) Applicant: BEIJING ZITIAO NETWORK TECHNOLOGY CO., LTD., Beijing (CN)

(72) Inventors: Liyue Zhao, Beijing (CN); Bowen Shen, Beijing (CN); Lingyu Wang, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/527,599

(22) Filed: Dec. 4, 2023

(65) Prior Publication Data

US 2024/0104671 A1  Mar. 28, 2024

Related U.S. Application Data

(63) Continuation of application No. PCT/CN2022/109975, filed on Aug. 3, 2022.

(30) Foreign Application Priority Data

Aug. 6, 2021 (CN) .......................... 202110905605.5

(51) Int. Cl.
*G06F 15/16* (2006.01)
*G06Q 50/00* (2012.01)
*H04L 51/04* (2022.01)

(52) U.S. Cl.
CPC ............. *G06Q 50/01* (2013.01); *H04L 51/04* (2013.01)

(58) Field of Classification Search
CPC ......... G06Q 50/01; H04L 51/04; H04L 41/22; H04L 29/08324; H04L 67/1059; H04L 29/08387; H04W 4/08
See application file for complete search history.

(56) References Cited

U.S. PATENT DOCUMENTS

2009/0319314 A1* 12/2009 Good ..................... G06Q 20/10
                                                                 715/752
2012/0284645 A1   11/2012 Sitrick et al.
(Continued)

FOREIGN PATENT DOCUMENTS

| CN | 110875871 A | 3/2020 |
| CN | 111108497 A | 5/2020 |

(Continued)

OTHER PUBLICATIONS

International Search Report (with English translation) and Written Opinion issued in PCT/CN2022/109975, dated Oct. 28, 2022, 8 pages provided.

*Primary Examiner* — John B Walsh
(74) *Attorney, Agent, or Firm* — Astute IP Law Group

(57) ABSTRACT

Disclosed in the embodiments of the present application are a method and apparatus for group management, an electronic device, and a storage medium. A specific embodiment of the method includes: presenting, in a first interface, a first control configured to perform a management setting for a first group, where the first interface is an interface other than an interface of the first group; and completing a corresponding group management setting for the first group in response to an operation for the first control in the first interface.

16 Claims, 5 Drawing Sheets

(56) References Cited

U.S. PATENT DOCUMENTS

| | | | | |
|---|---|---|---|---|
| 2018/0077542 | A1* | 3/2018 | Xie | H04W 4/12 |
| 2018/0365626 | A1* | 12/2018 | Mansour | G06Q 10/063118 |
| 2021/0243269 | A1* | 8/2021 | Gibbs | H04L 67/306 |

FOREIGN PATENT DOCUMENTS

| | | |
|---|---|---|
| CN | 111385186 A | 7/2020 |
| CN | 111654826 A | 9/2020 |

\* cited by examiner

METHOD AND APPARATUS FOR GROUP MANAGEMENT, ELECTRONIC DEVICE, AND STORAGE MEDIUM

CROSS-REFERENCE TO RELATED APPLICATION(S)

This disclosure is a Continuation application of International Patent Application No. PCT/CN2022/109975, filed Aug. 3, 2022, which claims priority to Chinese patent application No. 202110905605.5, filed on Aug. 6, 2021, and entitled "Method and apparatus for realizing group management, electronic device, and storage medium", the content which are incorporated in their entireties herein by reference.

FIELD

The present disclosure relates to the technical field of Internet, and in particular to a method and apparatus for group management, an electronic device, and a computer-readable storage medium.

BACKGROUND

With the development of the Internet, terminal devices have been used more frequently to fulfill various functions. For example, a user may interact with other users through instant messaging software installed on a terminal device. The interaction way may be individual conversation interaction of two users, or group conversation interaction of a plurality of users.

SUMMARY

The summary of the present disclosure is provided to introduce concepts in a simplified form, and the concepts are described in detail later in the detailed description of the embodiments. The summary of the present disclosure is neither intended to identify key features or essential features of the claimed solutions, nor intended to limit the scope of the claimed solutions.

In a first aspect, an embodiment of the present disclosure provides a method for group management. The method includes: presenting, in a first interface, a first control configured to perform a management setting for a first group, where the first interface is an interface other than an interface of the first group; and completing a corresponding group management setting for the first group in response to an operation for the first control in the first interface.

In a second aspect, an embodiment of the present disclosure provides an apparatus for group management. The device includes: a present unit configured to present, in a first interface, a first control configured to perform a management setting for a first group, where the first interface is an interface other than an interface of the first group; and a setting unit configured to complete a corresponding group management setting for the first group in response to an operation for the first control in the first interface.

In a third aspect, an embodiment of the present disclosure provides an electronic device. The electronic device includes: one or more processors; and a storage means configured to store one or more programs, the one or more programs, when the one or more programs are executed by the one or more processors, implementing the method for group management according to the first aspect.

In a fourth aspect, an embodiment of the present disclosure provides a computer-readable storage medium, storing a computer program thereon, where the program, when executed by a processor, implements the method for group management according to the first aspect.

BRIEF DESCRIPTION OF THE DRAWINGS

The above and other features, advantages, and aspects of embodiments of the present disclosure will become more apparent with reference to the following particular embodiments in conjunction with the drawings. The same or similar reference numerals refer to the same or similar elements throughout the drawings. It should be understood that the drawings are schematic, and that the parts and elements are not necessarily drawn to scale.

DETAILED DESCRIPTION OF EMBODIMENTS

Figure 1:
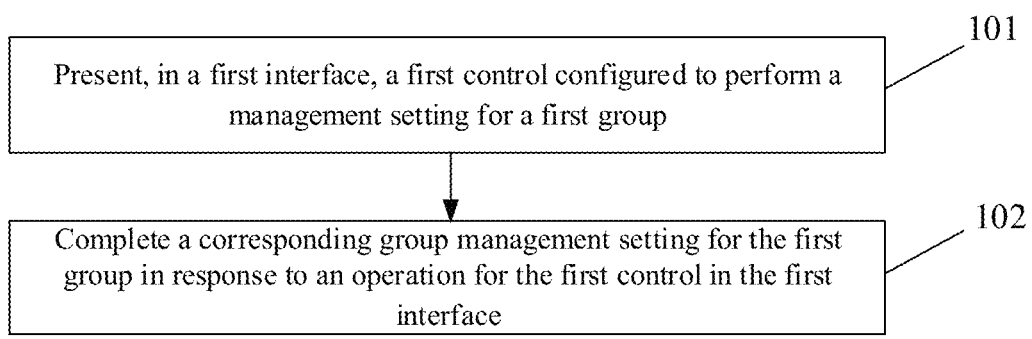
FIG. 1 is a flowchart of an embodiment of a method for group management according to the present disclosure.

Embodiments of the present disclosure are described in more detail below with reference to the drawings. Although some embodiments of the present disclosure are shown in the drawings, it should be understood that the present disclosure may be embodied in various forms and should not be construed as limited to the embodiments set forth herein, but rather, these embodiments are provided so that the present disclosure will be understood more thoroughly and completely. It should be understood that the drawings and embodiments of the present disclosure are for illustrative purposes merely and are not intended to limit the scope of protection of the present disclosure.

It should be understood that various steps recited in the method embodiments of the present disclosure can be performed in different orders and/or in parallel. Furthermore, the method embodiments can include additional steps and/or omit to execute the illustrated steps. The scope of the present disclosure is not limited in this respect.

As used herein, the term "comprise" or "include" and their variations are open-ended, that is, "comprise but not limited to" and "include but not limited to". The term "based on" is "based at least in part on". The term "an embodiment" means "at least one embodiment". The term "another embodiment" means "at least one further embodiment". The term "some embodiments" means "at least some embodiments". Definitions for other terms are given in the description below.

It should be noted that concepts such as "first" and "second" mentioned in the present disclosure are merely used to distinguish different apparatuses, modules or units, and are not used to limit the order of functions executed by these apparatuses, modules or units or their interdependence.

It should be noted that the modification with "a", "an" or "a plurality of" in the present disclosure is intended to be illustrative rather than limitative, and should be understood by those skilled in the art as "one or more" unless the context clearly dictates otherwise.

The names of messages or information exchanged between a plurality of apparatuses in the embodiments of the present disclosure are merely for illustrative purposes, and are not intended to limit the scope of these messages or information.

Group management is performed in an interface of the group, which results in that a user may only perform operations and settings in the interface of the group itself when the user needs to perform a group management for the group, which is relatively limited. Especially when the user needs to perform a management setting for a plurality of groups, the user needs to enter interfaces of the groups one by one for settings, which is complicated in operation and time-consuming.

With reference to FIG. 1, a flow of an embodiment of a method for group management according to the present disclosure is shown. As shown in FIG. 1, the method for group management includes the following:

Step 101, a first control configured to perform a management setting for a first group is presented in a first interface.

In this embodiment, an execution body (for example, a terminal device) of the method for group management may present, in the first interface, the first control configured to perform the management setting for the first group.

The first interface is an interface other than an interface of the first group.

In some application scenes, the interface of the first group include an interface associated with the first group only. In other words, the first control for managing the first group may be presented outside the first group, such that management control over the first group is extended.

Herein, one or a plurality of first controls may be provided.

In some application scenes, the first control presented in the first interface may implement one or more management settings.

In some application scenes, the management setting for a group may include, but is not limited to, at least one of: a group identifier management setting, a group member management setting, a robot assistant management setting, a message notification management setting, a group present management setting, a group disbanding management setting, etc.

As an instance, the group identifier management setting may include, but is not limited to, at least one of setting a group name, displaying a group quick response code, and sharing a group quick response code.

As an instance, the group member management setting may include, but is not limited to, at least one of adding a group member, and deleting a group member.

As an instance, the robot assistant management setting may include, but is not limited to, at least one of adding a robot assistant, and deleting a robot assistant. The robot assistant may send relevant messages and notifications in the group.

As an instance, the message notification management setting may include but is not limited to, at least one of a reminder of a new message from the group, no reminder of a new message from the group, and a mute reminder of a new message from the group.

As an instance, the group present management setting may include, but is not limited to, at least one of pinning the group at the top of a conversation list.

As an instance, the group disbanding management settings may include, but are not limited to, at least one of disbanding the group.

Step 102, a corresponding group management setting for the first group is completed in response to an operation for the first control in the first interface.

In this embodiment, a corresponding group management setting for the first group is completed in response to an operation for the first control in the first interface.

Herein, the manner in which the first control is operated to complete the corresponding group management setting may be set according to an actual application scene, and is not limited herein. For example, the first interface and service for managing the first group on the background may be connected, such that a management setting operation related to the first group on the first interface is transferred to the service, and then the service completes the management setting for the first group.

In some application scenes, the management setting may be completed by using one first control, or by using several first controls in cooperation.

As an instance, the operation of deleting a group member may be implemented in the following manner: a control labeled "Delete" corresponding to a group member identifier is displayed, and a user clicks the control to delete the group member. In this way, the control labeled "Delete" may be understood as the first control.

As an instance, the operation of deleting a group member may be implemented in the following manner: a control labeled "Delete" corresponding to a group member identifier is displayed; and a user clicks the control labeled "Delete" to display a control labeled "Confirm delete", and the user clicks the control labeled "Confirm delete" to delete the group member. In this way, the control labeled "Delete" and the control labeled "Confirm delete" may be the first control to implement the same management setting.

It should be noted that in the method for group management provided in this embodiment, the first control may be presented in the first interface other than the interface of the first group. The first control may be configured to perform a management setting for the first group. The corresponding group management setting for the first group may be completed in response to an operation for the first control in the first interface. Therefore, a new group management manner can be provided, which is convenient for an operation by a user.

It should be noted that in the new group management manner, the management setting for the first group may be performed in an interface other than the interface of the first group, such that convenience of management setting for the first group can be improved compared to a manner in which the management setting can be performed only by entering the interface of the first group.

In some embodiments, the method may further include: presenting, in the interface of the first group, a second control configured to perform a management setting for the first group; and completing a corresponding group management setting for the first group in response to an operation for the second control in the interface of the first group. A group management setting set corresponding to the first control is the same as, or has an empty intersection, or partially overlaps with a group management setting set corresponding to the second control.

Under the condition that the group management setting set corresponding to the first control is the same as the group management setting set corresponding to the second control, any management settings for the first group may be completed in the interface of the first group, or in the first interface.

Under the condition that the group management setting set corresponding to the first control has an empty intersection with the group management setting set corresponding to the second control, some management settings for the first group may only be completed in the interface of the first group, and the other management settings may only be completed in the first interface.

The condition that the group management setting set corresponding to the first control partially overlaps with the group management setting set corresponding to the second control includes three manners: 1) some management settings for the first group may only be completed in the first interface, and the other management settings may be completed in both the first interface and the interface of the first group; 2) some management settings for the first group may only be completed in the interface of the first group, and the other management settings may be completed in both the first interface and the interface of the first group; 3) some management settings for the first group may only be completed in the interface of the first group, some management settings may only be completed in the first interface, and some other management settings may be completed in both the first interface and the interface of the first group.

Herein, the group management setting set corresponding to the first control and the group management setting set corresponding to the second control may have an intersection being empty or not. The case that the intersection is not empty may include two situations: the two sets are the same; and the intersection is a proper subset of at least one of the two sets.

As an instance, the management setting for the first group may include, but is not limited to, at least one of a group identifier management setting, a group member management setting, a robot assistant management setting, a message notification management setting, a group display management setting, a group disbanding management setting, etc.

An instance in which the intersection is empty is as follows. The group management setting set corresponding to the first control may include a group identifier management setting, a group member management setting, and a group disbanding management setting. The group management setting set corresponding to the second control may include a robot assistant management setting, a message notification management setting, and a group present management setting.

An instance in which the two sets are the same is as follows. The group management setting sets corresponding to the first control may both include a group identifier management setting, a group member management setting, a robot assistant management setting, a message notification management setting, a group present management setting, and a group disbanding management setting.

An instance in which the intersection is a proper subset of at least one of the two sets (the group management setting set corresponding to the first control and/or the group management setting set corresponding to the second control) is as follows. The group management setting set corresponding to the first control may include a group identifier management setting, a group member management setting, a robot assistant management setting, a message notification management setting, a group display management setting, and a group disbanding management setting. The group management setting set corresponding to the second control may include a robot assistant management setting, a message notification management setting, and a group display management setting.

It should be noted that in a case that the group management setting set corresponding to the first control is the same as the group management setting set corresponding to the second control, the management setting for the first group may be implemented in both the interface of the first group and the first interface, such that efficiency of management setting for the first group is improved.

It should be noted that in a case that the group management setting set corresponding to the first control has an empty intersection with the group management setting set corresponding to the second control, some group management settings are extended to the first interface, such that a user can conveniently manage groups with higher efficiency.

It should be noted that a case that the group management setting set corresponding to the first control partially overlaps with the group management setting set corresponding to the second control, is applicable to scenes where individual items of the management setting are classified. Different types may be presented in the first interface or the interface of the first group, respectively, such that the several first controls are presented in a target manner, so as to improve operation efficiency for the first controls of different types.

In some embodiments, the first interface may belong to an associated information entity. Herein, the associated information entity may indicate an object having management permission for the first group.

During information exchange, an entity represents any hardware or software process that can send or receive information. The associated information entity may be an information entity having a preset association relation with the first group.

Alternatively, the associated information entity may include, but is not limited to, at least one of a parent group to which the first group belongs, a group owner of the first group, an administrator of the first group, a team associated with the first group, etc. The parent group and the team will be explained later.

It should be noted that the first interface is presented at the associated information entity of the first group. The associated entity performs the management setting for the first group without entering the interface of the first group, such that operations of the associated entity are reduced, and efficiency of the associated information entity for management setting for the first group is improved.

In some embodiments, the method may further include: presenting a third control in the interface of the first group.

Herein, the third control may be configured to send an approval request to the associated information entity. The approval request may be configured to request to complete the corresponding group management setting for the first group.

For a management setting possessed by the first control rather than the second control, a third control may be provided in the interface of the first group, such that an approval request may be sent to the associated information entity by means of the third control in the interface of the first group, further facilitating the user and improving the efficiency. In this scene, the first control may have a function of confirming approval obtainment, the associated information entity may completes the approval by means of this function, and an approval result includes a case of obtaining an approval and a case of denying an approval.

As an instance, in the first interface, two first controls may be provided for the management setting of adding a new member. The first control of a first type may add a new member to the first group directly by a user operating the first interface. The first control of a second type may be related to the third control of the first group, that is, when an operation (for example, an application of adding User A to the first group) for the third control is detected in the interface of the first group, an approval request may be sent to the associated information entity. A first interface of the associated information entity may present the first control of a second type, and the first control of a second type is used for the user to confirm whether the approval is obtained. Under the condition that the user clicks OK, User A may be added to the first group.

It should be noted that when the third control is presented in the first group, an application entry of the management setting may be reserved for the first group while the management setting is implemented in the first interface. The situation that members of the first group have no permission to manage the group at all is avoided.

In some embodiments, the method further includes: presenting first indication information in the interface of the first group.

Herein, the first indication information is configured to indicate that the corresponding group management setting for the first group is capable of being completed by an operation in the first interface.

In some application scenes, the interface of the first group presents the first indication information, which guides a member of the first group to the first interface (that is, an interface other than the interface of the first group) to operate the management setting for the first group.

Therefore, when a member of the first group needs to perform a management setting for the first group, an explanation may be provided for the member, to satisfy setting requirements of the member of the first group and avoid confusion of the member of the first group about how to perform a management setting.

In some embodiments, the first control includes a control associated with a change in group members.

Herein, the control associated with a change in group members may include a control capable of causing the group members to change.

The control associated with a change in group members is presented in the first interface, such that the group members of the first group can be changed in the first interface.

In some embodiments, the control associated with a change in group members includes, but is not limited to, at least one of a group entrance path presenting control; a group member adding control; a group member deleting control; an approving control for a group entrance request from a new member; and a first disbanding control. The first disbanding control is configured to disband the first group.

Figure 2:
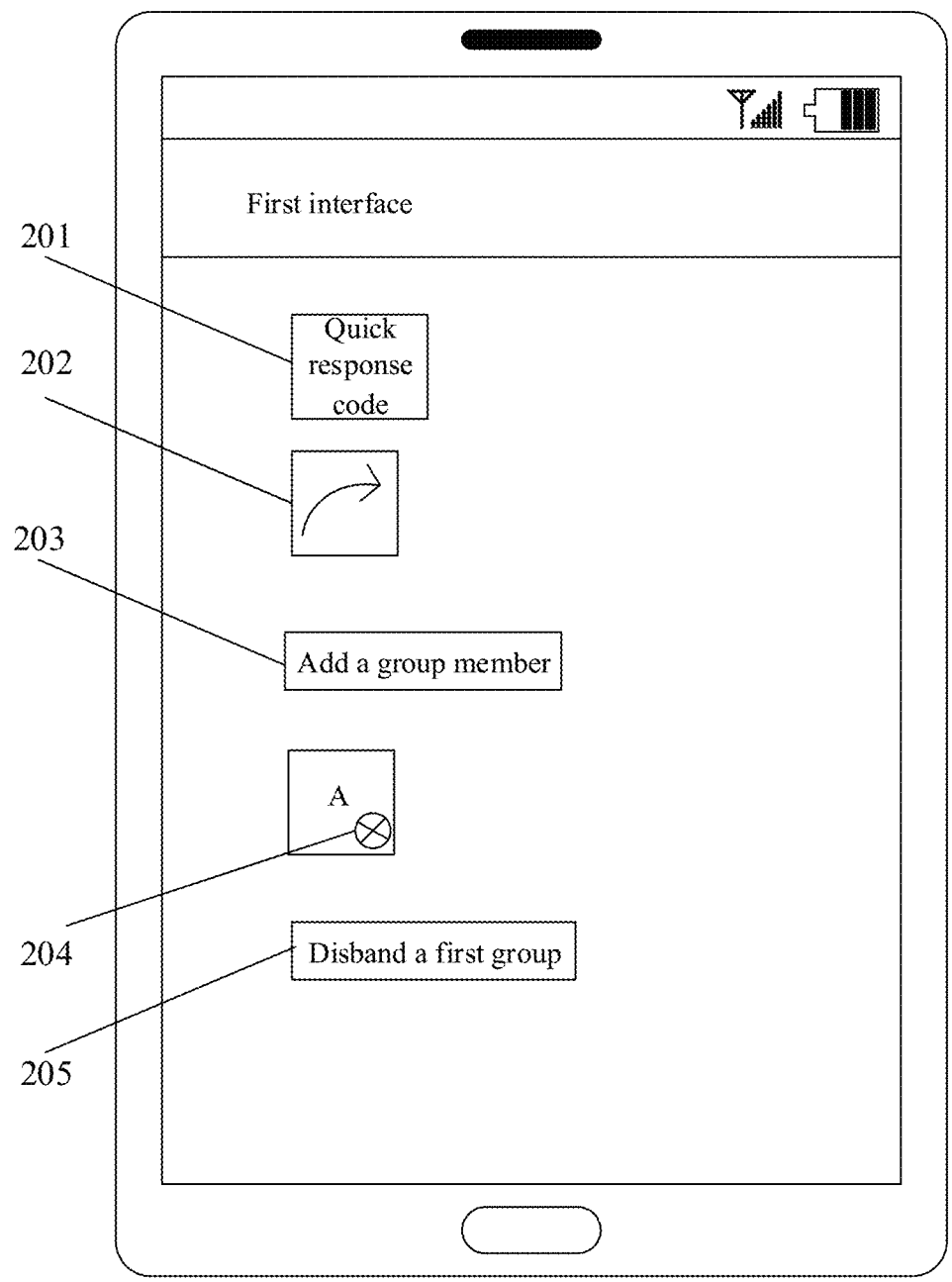
FIG. 2 is a schematic diagram of an application scene of a method for group management according to the present disclosure.

As an instance, with reference to FIG. 2, FIG. 2 is an illustrative schematic diagram of a first control presented in the first interface. In FIG. 2, a group quick response code 201, a group sharing control 202, a group member adding control 203, a group member deleting control 204, and a first disbanding control 205 for disbanding the first group may be presented.

Herein, a group entrance path may have information guiding group entrance. For example, the group entrance path may include a group quick response code. The group entrance path may further include a group sharing control, and the group sharing control may be used for sharing a group card or a group quick response code.

Herein, the group member adding control may be configured to add a new member to the first group.

Herein, the group member deleting control may be configured to delete a member from the first group.

Herein, the approving control for a group entrance request of a new member may be configured to confirm whether to add the new member to the first group. As an instance, the first group may present a request control. An application control is configured to trigger to send a new member adding request (for requesting addition of a candidate user to the first group). Under the condition that the user triggers the application control, the first interface may present the approving control for a new application adding request.

It should be noted that a change in group members is set in the first interface, such that the group members of the first group can be managed outside the first group.

In some embodiments, the first interfaces may include a team management interface corresponding to a team associated with the first group.

Herein, the team is associated with a team member set, and the first group includes at least a part of members of the team member set.

In some embodiments, in an instant messaging (IM) system, establishment of a team first defines a fixed group of contacts as a team member set, and the team is perceived by users as a team identifier in an IM interface. At least one group is associated with the team based on the team member set. Herein, the group refers to a carrier for carrying information interaction of multiple people in the instant messaging system. The group belongs to an existing technology, which will not be repeated herein.

In this way, a concept of "team" is provided in IM. The team is a relatively stable group of people. The user may create a new team to invite members to join, and may also upgrade an existing group to a team.

In some embodiments, the groups under the team are a plurality of groups with different topics but the same members. The group members of any group are all team members. The groups may be topic groups or conversation groups. A new group may be created under the team, or an existing group may be added to the team. In this way, in the "team", information is kept transparent to the greatest extent. With mute notification, it is guaranteed that the team members can actively discover and obtain information without being excessively disturbed.

It should be noted that management setting for the first group in the team management interface can guarantee that the relevant setting for the first group satisfy requirements of the team as much as possible. As an instance, a change in members of the first group is managed by the team, such that the members of the first group can be ensured to be suitable for the team as much as possible, and the situation of team chaos caused by the entry of members who are not suitable for the team in the first group can be avoided. Moreover, through the team management interface, all groups associated with the team may be managed in the same interface, which facilitates an operation of a team administrator and improves efficiency.

In some embodiments, the first interface includes a team management interface corresponding to a team associated with the first group, the team is associated with a team member set, and the first group includes at least a part of members of the team member set. Under such a condition, the method further includes: presenting, upon determining that the first interface comprises the team management interface, at least one of the following in the interface of the first group: a jump link, and second indication information.

Figure 3:
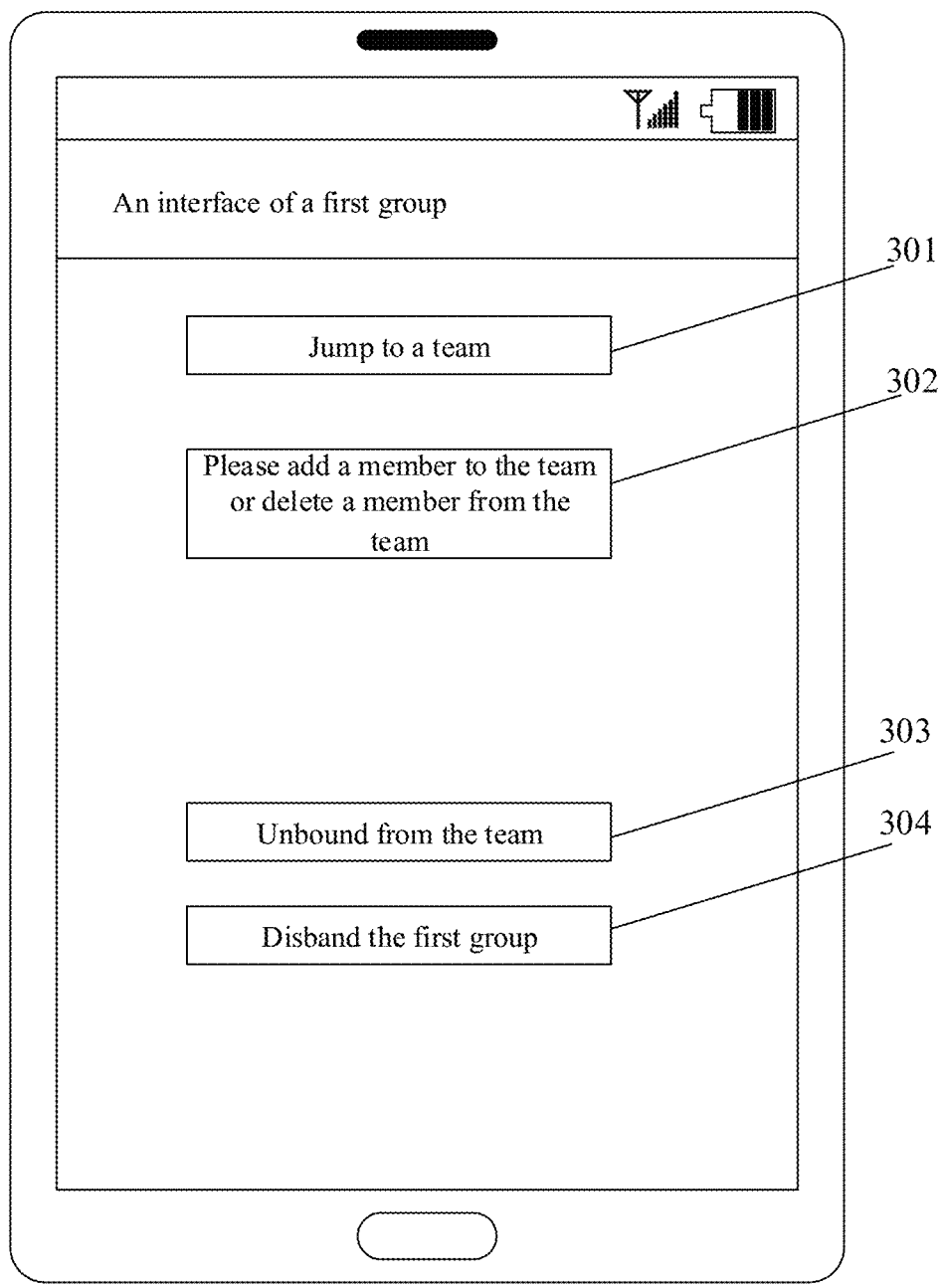
FIG. 3 is a schematic diagram of an application scene of a method for group management according to the present disclosure.

With reference to FIG. 3, FIG. 3 shows corresponding content presented in the interface of the first group when the first control is presented in the team management interface. As an instance, the interface of the first group may present a jump link 301 and second indication information 302. The second indication information 302 may indicate the words "Please add a member to the team or delete a member from the team". A user may be guided to the team management interface to perform management setting by means of the second indication information.

Herein, the jump link is configured to trigger presenting of a team presenting interface corresponding to the team identifier in response to an operation. The team presenting interface may be an interface related to the team. A team content presented in the team present interface may be any team content, which is not limited herein. The team present interface may also be the first interface described above.

It should be noted that presenting the above jump link can improve a speed of opening the team present interface. For example, serving as a bridge from the first group to the team, the jump link can reduce operation steps of switching from presenting the first group to presenting the team, so as to improve a switching speed from presenting the first group to presenting the team.

Alternatively, the second indication information is configured to indicate one or more of the following: team member addition to add a first group member, team member deletion to delete a first group member, team leaving to leave from the first group.

It should be noted that the present of the second indication information informs the members of the first group about that the change in members of the first group may be achieved by changing the team members, so as to avoid confusion of the members of the first group about how to change the members of the first group, and improve the operation efficiency of the members of the first group.

In some embodiments, the first group includes a user of a first type. The user of a first type has management permission for the first group. In some application scenes, a user of a first type may be referred to as a group owner or a group administrator. Typically, a group has one group owner, and may have a plurality of group administrators.

In some embodiments, the first interface includes a team management interface corresponding to a team associated with the first group, the team is associated with a team member set, and the first group includes at least a part of members of the team member set. In such a condition, the method may further include: presenting, upon determining that the first interface comprises the team management interface, at least one of the following in the interface of the first group corresponding to the user of the first type: a relation unbinding control and a second disbanding control. Upon determining that the first interface includes a team management interface, it can be understood that the first group is a group under the team. In this case, the first group will be called a team group.

With reference to FIG. 3, FIG. 3 shows a relation unbinding control 303 and a second disbanding control 304 presented in a group administrator interface when the interface of the first group is the group administrator interface.

Herein, a relation unbinding control is configured to unbind an association relation between the first group and the team. That is, the group administrator of the team group may determine whether to unbind the association relation between the group and the team. After the association relation between the group and the team is unbound, management permission for the team over the group may be revoked, that is, the team management interface serving as the first interface no longer presents the first control.

Herein, the second disbanding control is configured to disband the first group. That is to say, the group administrator interface of the team group may present the second disbanding control, and the group administrator may trigger to disband the team group by operating the second disbanding control.

It should be noted that presenting the relation unbinding control in the group administrator interface can control permission to unbind a binding relation between the first group and the team within a group administrator range, so as to avoid the relation between the first group and the team being chaotic due to the loss of control over this permission (for example, misoperation by ordinary members in the first group) and improve interaction efficiency of the team. Presenting the second disbanding control in the group administrator interface may avoid false disbanding of the first group caused by permission abuse of disbanding the first group and improve interaction efficiency of the first group.

In some embodiments, the method further includes: present prompt information in response to detecting a trigger operation for the second disbanding control upon determining that the first group is a default communication group of the team.

Herein, the prompt information is configured to prompt that the first group is incapable of being disbanded upon determining that the team exists.

In some embodiments, members in the default communication group are consistent with members in the team, the default communication group exists since the team is created, and an association relation between the default communication group and the team is incapable of being unbound upon determining that the team exists.

Alternatively, the default communication group may be created once the team is created. The default communication group may be used for presenting notifications of the team.

It should be noted that during the existence of the team, the default communication group is incapable of being disbanded. Therefore, failure of present of the team notification is avoided, and it is guaranteed that at least one group exists under the team. Furthermore, it is guaranteed that the team members have at least one group for information communication. Under the condition that the group administrator operates the second unbinding control, the prompt information is presented, and then the group administrator can be timely reminded of a reason why the group is incapable of being disbanded, such that the group administrator can perform other operations to satisfy actual needs.

In some embodiments, the first interface may include a personal user management interface of a group owner or a group administrator of the first group.

A personal user management interface of a group owner or a group administrator may be used to manage personal matters related to the user.

It should be noted that in the personal user management interface of the user, the efficiency of the user performing management setting for the first group is improved. For example, a first control of a group in which the user is the group owner is presented in the personal user management interface, such that the user can manage each group in which the user is the group owner in the personal user management interface. The groups can be managed in batch, time for entering each group interface to perform management setting is saved, and a speed of group management setting is improved.

In some embodiments, the first interface may include a management interface of a parent group for the first group.

Herein, the first group may belong to the parent group, and the group members of the first group are a subset of group members of the parent group. For example, the members of the first group may be identical to the members of the parent group, and the members of the first group may also be a part of members of the parent group.

The first group may be understood as a subgroup of the parent group. In some application scenes, a part of members may be selected from the group to generate a subgroup of the group. A parent-child relation may be defined between the group and the subgroup generated based on the group.

It should be noted that presenting the first control for the first group in the management interface of the parent group may achieve management setting for the first group in the parent group, such that the operation efficiency of the parent group in managing the subgroup is improved. As for the parent group, the first control for the subgroup of the parent group is presented in the management interface of the parent group, such that the user can operate a management setting for the subgroup in the parent group management interface, to manage subgroups in batch. The time for entering the subgroups one by one for management is saved, and the speed of management settings for the subgroups is improved.

Figure 4:
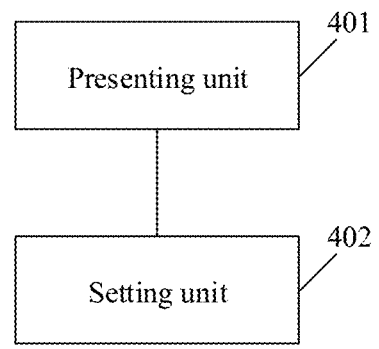
FIG. 4 is a schematic structural diagram of an embodiment of an apparatus for group management according to the present disclosure.

With further reference to FIG. 4, as an implementation of the methods shown in the above figures, the present disclosure provides an embodiment of an apparatus for group management. The apparatus embodiment corresponds to the method embodiment shown in FIG. 1, and the apparatus may be specifically applied to various electronic devices.

As shown in FIG. 4, the apparatus for group management in the embodiment includes a presenting unit 401 and a setting unit 402. The present unit is configured to present, in a first interface, a first control configured to perform a management setting for a first group, where the first interface is an interface other than an interface of the first group. The setting unit is configured to complete a corresponding group management setting for the first group in response to an operation for the first control in the first interface.

In the embodiment, specific processing of the present unit 401 and the setting unit 402 of the apparatus for group management and generated technical effects may be respectively described with reference to relevant explanation of steps 101 and 102 in the corresponding embodiment of FIG. 1, which will not be repeated herein.

In some embodiments, the apparatus is further configured to present, in the interface of the first group, a second control configured to perform a management setting for the first group; and complete a corresponding group management setting for the first group in response to an operation for the second control in the interface of the first group. A group management setting set corresponding to the first control is the same as, or has an empty intersection, or partially overlaps with a group management setting set corresponding to the second control.

In some embodiments, the first interface includes one or more of the following: a personal user management interface of a group owner of the first group; and a management interface of a parent group for the first group, where the first group belongs to the parent group, and group members of the first group are a subset of group members of the parent group.

In some embodiments, the first interface includes a team management interface corresponding to a team identifier associated with the first group, the team identifier is associated with a team member set, and the first group includes at least a part of members of the team member set.

In some embodiments, the first interface belongs to an associated information entity, and the associated information entity indicates an object having management permission for the first group.

In some embodiments, the apparatus is further configured to present a third control in the interface of the first group. The third control is configured to send an approval request to the associated information entity, and the approval request is configured to request to complete the corresponding group management setting for the first group.

In some embodiments, the apparatus is further configured to present first indication information in the interface of the first group. The first indication information is configured to indicate that the corresponding group management setting for the first group is capable of being completed by an operation in the first interface.

In some embodiments, the first control includes a control associated with a change in group members.

In some embodiments, the control associated with a change in group members includes at least one of the following: a group entrance path presenting control; a group member adding control; a group member deleting control; an approving control for a group entrance request from a new member; and a first disbanding control. The first disbanding control is configured to disband the first group.

In some embodiments, the apparatus is further configured to present, upon determining that the first interface includes the team management interface, at least one of the following in the interface of the first group: a jump link, configured to trigger presenting of a team presenting interface corresponding to the team identifier in response to an operation; and second indication information, configured to indicate one or more of the following: team member addition to add a first group member, team member deletion to delete a first group member, and team leaving to leave from the first group.

In some embodiments, the first group includes a user of a first type. The user of the first type has management permission for the first group. The apparatus is further configured to present, upon determining that the first interface comprises the team management interface, at least one of the following in the interface of the first group corresponding to the user of the first type: a relation unbinding control configured to unbind an association relation between the first group and the team identifier; and a second disbanding control configured to disband the first group.

In some embodiments, the apparatus is further configured to present prompt information in response to detecting a trigger operation for the second disbanding control upon determining that the first group is a default communication group of the team. The prompt information is configured to prompt that the first group cannot be disbanded upon determining that the team exists.

In some embodiments, members in the default communication group are consistent with members in the team, and an association relation between the default communication group and the team cannot be unbound upon determining that the team exists.

Figure 5:
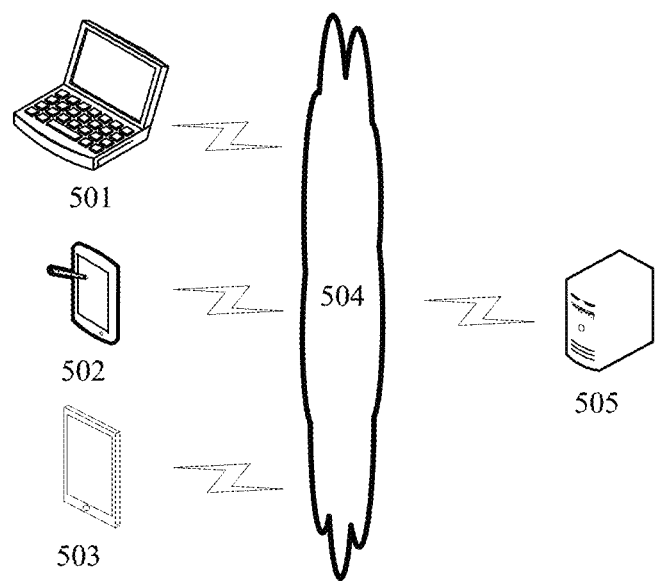
FIG. 5 is an illustrative system architecture to which a method for group management of an embodiment of the present disclosure can be applied.

With reference to FIG. 5, FIG. 5 is an illustrative system architecture in which a method for group management of an embodiment of the present disclosure may be used.

As shown in FIG. 5, the system architecture may include terminal devices 501, 502, and 503, a network 504, and a server 505. The network 504 is configured to provide a medium for communication links between the terminal devices 501, 502, 503 and the server 505. The network 504 may include various connection types, such as wired communication links, wireless communication links, fiber optic cables, etc.

The terminal devices 501, 502, 503 may interact with the server 505 by means of the network 504, to receive or send messages, etc. Various client applications, such as web browser applications, search applications, and news applications, may be installed on the terminal devices 501, 502, and 503. The client applications in the terminal devices 501, 502, and 503 may receive instructions from a user and perform corresponding functions according to the instructions from the user, for example, adding corresponding information to information according to the instructions from the user.

The terminal devices 501, 502 and 503 may be hardware or software. When the terminal devices 501, 502 and 503 are hardware, the terminal devices may be various electronic devices having a display screen and supporting web browsing, and include, but not limited to, smart phones, tablet computers, e-book readers, moving picture experts group audio layer III (MP3) players, moving picture experts group audio layer IV (MP4) players, laptop computers, desktop computers, etc. When the terminal devices 501, 502, and 503 are software, the terminal devices may be installed in the electronic devices listed above. The terminal devices may be implemented as a plurality of pieces of software or software modules (for example, software or software modules configured to provide distributed services) or as a single piece of software or software module, which are not specifically limited herein The server 505 may be a server providing various services, for example, receiving information obtaining requests sent from the terminal devices 501, 502, and 503, obtaining presenting information corresponding to the information obtaining requests in various ways according to the information obtaining requests, and sending related data of the presenting information to the terminal devices 501, 502 and 503.

It should be noted that the method for group management provided in the embodiments of the present disclosure may be executed by a terminal device. Accordingly, the apparatus for group management may be arranged in the terminal devices 501, 502, and 503. Moreover, the method for group management provided in the embodiments of the present disclosure may also be executed by the server 505. Accordingly, the apparatus for group management may be arranged in the server 505.

It should be understood that the number of terminal devices, networks and servers in FIG. 5 is merely illustrative. There may be any number of terminal devices, networks and servers depending on implementation needs.

Figure 6:
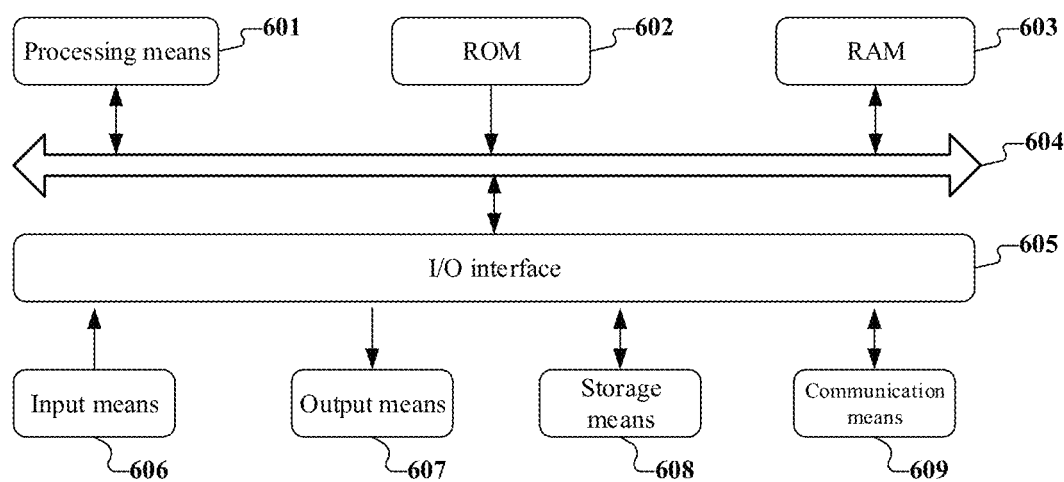
FIG. 6 is a schematic diagram of a basic structure of an electronic device provided in an embodiment of the present disclosure.

With reference to FIG. 6 below, a schematic structural diagram suitable for implementing an electronic device (for example, a terminal device or server in FIG. 5) in an embodiment of the present disclosure is shown. The terminal device in the embodiments of the present disclosure may include, but is not limited to, mobile terminals such as mobile phones, notebook computers, digital broadcast receivers, personal digital assistants (PDA), tablet computers (PAD), portable multimedia players (PMP), in-vehicle terminals (for example, in-vehicle navigation terminals), etc., and fixed terminals such as digital televisions (TV), desktop computers, etc. The electronic device illustrated in FIG. 6 is merely an instance and should not impose any limitation on the functions and scope of use of the embodiments of the present disclosure.

As shown in FIG. 6, the electronic device may include a processing means 601 (for example, a central processing unit, a graphics processing unit, etc.) that may execute various appropriate actions and processes according to programs stored in a read-only memory (ROM) 602 or programs loaded from a storage means 608 into a random-access memory (RAM) 603. The RAM 603 also stores various programs and data needed for the operations of the electronic device 600. The processing means 601, the ROM 602, and the RAM 603 are connected to each other by means of a bus 604. An input/output (I/O) interface 605 is also connected to the bus 604.

Typically, the following apparatuses may be connected to the I/O interface 605: an input means 606 including, for example, a touch screen, a touch pad, a keyboard, a mouse, a camera, a microphone, an accelerometer, a gyroscope, etc.; an output means 607 including, for example, a liquid crystal present (LCD), a speaker, a vibrator, etc.; a storage means 608 including, for example, a magnetic tape, a hard disk, etc.; and a communication means 609. The communication means 609 may allow the electronic device to be in wireless or wired communication with other devices to exchange data. While FIG. 6 illustrates an electronic device having various apparatuses, it should be understood that not all of the illustrated apparatuses are required to be implemented or provided. More or fewer apparatus may alternatively be implemented or provided.

In particular, according to embodiments of the present disclosure, a processes described above with reference to the flowcharts may be implemented as a computer software program. For example, embodiments of the present disclosure include a computer program product. The computer program product includes a computer program carried on a non-transitory computer-readable medium, and the computer program includes a program code for executing the method illustrated in the flowchart. In such embodiments, the computer program may be downloaded and installed from a network by means of the communication means 609, or installed from the storage device 608, or installed from the ROM 602. When executed by the processing means 601, the computer program executes the above-described functions defined in the method of the embodiment of the present disclosure.

It should be noted that the computer-readable medium in the present disclosure may be a computer-readable signal medium or a computer-readable storage medium, or any combination of a computer-readable signal medium and a computer-readable storage medium. The computer-readable storage medium may be, for example, but is not limited to, an electronic, magnetic, optical, electromagnetic, infrared, or semiconductor system, apparatus, or device, or any combination of the foregoing. More specific instance of the computer-readable storage medium may include, but is not limited to, an electrical connection based on one or more wires, a portable computer diskette, a hard disk, a random-access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In the present disclosure, the computer-readable storage medium may be any tangible medium that includes or stores a program for use by or in conjunction with an instruction execution system, apparatus, or device. In the present disclosure, the compute-readable signal medium may include a data signal propagating in a baseband or as part of a carry wave and carrying a computer-readable program code. Such a propagated data signal may have a variety of forms and may include, but is not limited to, an electromagnetic signal, an optical signal, or any suitable combination of the foregoing. The computer-readable signal medium may also be any computer-readable medium besides a computer-readable storage medium. The computer-readable signal medium can send, propagate, or transmit a program for use by or in conjunction with an instruction execution system, apparatus, or device. A program code included on a computer-readable medium may be transmitted by means of any suitable medium, including, but not limited to, wires, fiber optic cables, radio frequency (RF), etc., or any suitable combination of the foregoing.

In some embodiments, a client side and a server may communicate by using any currently known or future developed network protocol, such as a hypertext transfer protocol (HTTP), and may be interconnected with any form or medium of digital data communication (for example, a communication network). Instances of communication networks include a local area network (LAN), a wide area network (WAN), Internet work (for example, the Internet), and an end-to-end network (for example, an ad hoc end-to-end network), as well as any currently known or future developed network.

The computer-readable medium may be included in the above electronic device, and may also exist independently without being assembled into the electronic device.

The computer-readable medium carries one or more programs. When the one or more programs are executed by the electronic device, the electronic device is caused to: present, in a first interface, a first control configured to perform a management setting for a first group, where the first interface is an interface other than an interface of the first group; and the electronic device completes a corresponding group management setting for the first group in response to an operation for the first control in the first interface.

In some embodiments, the electronic device is further configured to present, in the interface of the first group, a second control configured to perform a management setting for the first group; and complete a corresponding group management setting for the first group in response to an operation for the second control in the interface of the first group. A group management setting set corresponding to the first control is the same as, or has an empty intersection, or partially overlaps with a group management setting set corresponding to the second control.

In some embodiments, the first interface includes one or more of the following: a personal user management interface of a group owner or a group administrator of the first group; and a management interface of a parent group for the first group, where the first group belongs to the parent group, and group members of the first group are a subset of group members of the parent group.

In some embodiments, the first interface includes a team management interface corresponding to a team associated with the first group, the team is associated with a team member set, and the first group includes at least a part of members of the team member set.

In some embodiments, the first interface belongs to an associated information entity, and the associated information entity indicates an object having management permission for the first group.

In some embodiments, the electronic device is further configured to present a third control in the interface of the first group. The third control is configured to send an approval request to the associated information entity, and the approval request is configured to request to complete the corresponding group management setting for the first group.

In some embodiments, the electronic device is further configured to present first indication information in the interface of the first group. The first indication information is configured to indicate that the corresponding group management setting for the first group is capable of being completed by an operation in the first interface.

In some embodiments, the first control includes a control associated with a change in group members of the first group.

In some embodiments, the control associated with the change in group members includes at least one of the following: a group entrance path presenting control; a group member adding control; a group member deleting control; an approving control for a group entrance request from a new member; and a first disbanding control. The first disbanding control is configured to disband the first group.

In some embodiments, the electronic device is further configured to present, upon determining that the first interface comprises the team management interface, at least one of the following in the interface of the first group: a jump link, configured to trigger present of a team present interface corresponding to the team in response to an operation; and second indication information, configured to indicate one or more of the following: team member addition to add a first group member, team member deletion to delete a first group member, and team leaving to leave from the first group.

In some embodiments, the first group includes a user of a first type. The user of a first type has management permission for the first group. The electronic device is further configured to: present, upon determining that the first interface comprises the team management interface, at least one of the following in the interface of the first group corresponding to the user of the first type: a relation unbinding control configured to unbind an association relation between the first group and the team; and a second disbanding control configured to disband the first group.

In some embodiments, the electronic device is further configured to present prompt information in response to detecting a trigger operation for the second disbanding control upon determining that the first group is a default communication group of the team. The prompt information is configured to prompt that the first group cannot be disbanded upon determining that the team exists.

In some embodiments, members in the default communication group are consistent with members in the team, the default communication group exists since the team is created, and an association relation between the default communication group and the team cannot be unbound upon determining that the team exists.

A computer program code for performing operations of the present disclosure may be written in one or more programming languages, or combinations of the programming languages. The programming languages include, but are not limited to, object-oriented programming languages, such as Java, Smalltalk, and C++, and further include conventional procedural programming languages, such as the C programming language or similar programming languages. The program code may be executed entirely on a user computer, partly on a user computer, as a stand-alone software package, partly on a user computer and partly on a remote computer, or entirely on a remote computer or server. In the case involving a remote computer, the remote computer may be connected with a user computer through any kind of network, including a local area network (LAN) or a wide area network (WAN), or may be connected with an external computer (for example, connected through the Internet by using an Internet service provider).

The flowcharts and block diagrams in the accompanying drawings illustrate the architecture, functionality, and operations possibly implemented by the systems, methods, and computer program products according to various embodiments of the present disclosure. In this regard, each block in the flowcharts or block diagrams may represent a module, a program segment, or part of a code, and a module, a program segment, or part of a code includes one or more executable instructions for implementing a specified logical function. It should also be noted that in some alternative implementations, a function noted in a block may occur in a different order than an order noted in the figures. For example, two consecutive blocks may actually be executed substantially in parallel, or in a reverse order sometimes, depending on a function involved. It should also be noted that each block in the block diagrams and/or flowcharts, and combinations of blocks in the block diagrams and/or flowcharts, can be implemented by special purpose hardware-based systems that perform specified functions or operations, or can be implemented by combinations of special purpose hardware and computer instructions.

The units described in the embodiment of the present disclosure may be implemented in software or hardware. The name of a unit does not constitute a limitation on the unit itself under certain circumstances. For example, a presentation unit may also be described as "a unit presenting a first control".

The functions described above herein may be executed at least partially by one or more hardware logic components. For example, without limitation, exemplary types of the hardware logic components that may be used include: a field programmable gate array (FPGA), an application specific integrated circuit (ASIC), an application specific standard product (ASSP), a system on chip (SOC), a complex programmable logic device (CPLD), etc.

In the context of the present disclosure, the machine-readable medium may be a tangible medium that may include or store a program for use by or in conjunction with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the foregoing. More specific instance of the machine-readable storage medium may include an electrical connection based on one or more wires, a portable computer diskette, a hard disk, a random-access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing.

The above description is merely illustrative of preferred embodiments of the present disclosure and principles of the technology employed. It should be understood by those skilled in the art that the disclosed scope involved in the present disclosure is not limited to the technical solutions in which the above-described technical features are specifically combined, but encompasses other technical solutions in which the above-described technical features or equivalent features thereof are arbitrarily combined without departing from the concept of the present disclosure, for example, technical solutions formed by interchanging the features described above with (non-limitative) technical features disclosed in the present disclosure that have similar functions.

Furthermore, although operations are depicted in a particular order, this should not be understood as requiring that such operations be performed in the particular order shown or in a sequential order. In certain circumstances, multitasking and parallel processing may be advantageous. Similarly, although several specific implementation details are included in the above discussion, these details should not be construed as limitations on the scope of the present disclosure. Some features that are described in the context of separate embodiments may also be implemented in combination in a single embodiment. Conversely, various features described in the context of a single embodiment can also be implemented in multiple embodiments separately or in any suitable sub-combination manner.

Although the subject matter has been described in language specific to structural features and/or methodological logical actions, it should be understood that the subject matter defined in the appended claims is not necessarily limited to the specific features or actions described above. Rather, the specific features and actions described above are merely instance forms of implementing the claims.

We claim:

1. A method for group management, comprising:
presenting, in a first interface, a first control configured to perform a management setting for a first group,
wherein the first interface is an interface other than an interface of the first group; and
completing a corresponding group management setting for the first group in response to an operation for the first control in the first interface,
wherein
the first interface comprises a team management interface corresponding to a team associated with the first group, the team is associated with a team member set, and the first group comprises at least a part of members of the team member set;
the first group comprises a user of a first type,
wherein the user of the first type has management permission for the first group; and
the method further comprises:
presenting, upon determining that the first interface comprises the team management interface, at least one of the following in the interface of the first group corresponding to the user of the first type:
a relation unbinding control configured to unbind an association relation between the first group and the team, and
a second disbanding control configured to disband the first group; and
presenting prompt information in response to detecting a trigger operation for the second disbanding control upon determining that the first group is a default communication group of the team, and
wherein further the prompt information is configured to prompt that the first group is incapable of being disbanded upon determining that the team exists.

2. The method according to claim 1, further comprising:
presenting, in the interface of the first group, a second control configured to perform a management setting for the first group; and completing a corresponding group management setting for the first group in response to an operation for the second control in the interface of the first group; wherein
   a group management setting set corresponding to the first control is the same as a group management setting set corresponding to the second control, or
   an intersection between a group management setting set corresponding to the first control and a group management setting corresponding to the second control is null, or
   a group management setting set corresponding to the first control partially overlaps with a group management setting set corresponding to the second control.

3. The method according to claim 1, wherein
the first interface belongs to an associated information entity, and
the associated information entity indicates an object having management permission for the first group.

4. The method according to claim 3, further comprising:
presenting a third control in the interface of the first group, wherein
   the third control is configured to send an approval request to the associated information entity, and
   the approval request is configured to request to complete the corresponding group management setting for the first group.

5. The method according to claim 1, further comprising:
presenting first indication information in the interface of the first group;
   wherein the first indication information is configured to indicate that the corresponding group management setting for the first group is capable of being completed by an operation in the first interface.

6. The method according to claim 1, wherein the first control comprises a control associated with a change in group members of the first group.

7. The method according to claim 6, wherein the control associated with the change in the group members comprises at least one of the following:
   a group entrance path presenting control;
   a group member adding control;
   a group member deleting control;
   an approving control for a group entrance request from a new member; and
   a first disbanding control, wherein the first disbanding control is configured to disband the first group.

8. The method according to claim 1, wherein
the first interface comprises a team management interface corresponding to a team associated with the first group, the team is associated with a team member set, and the first group comprises at least a part of members of the team member set; and
the method further comprises:
   presenting, upon determining that the first interface comprises the team management interface, at least one of the following in the interface of the first group:
      a jump link, configured to trigger presenting of a team presenting interface corresponding to the team in response to an operation; and
      second indication information, configured to indicate one or more of the following:
         team member addition to add a first group member,
         team member deletion to delete a first group member, and
         team leaving to leave from the first group.

9. The method according to claim 1, wherein
members in the default communication group are consistent with members in the team, the default communication group exists since the team is created, and
an association relation between the default communication group and the team is incapable of being unbound upon determining that the team exists.

10. An electronic device, comprising:
one or more processors; and
a storage means configured to store one or more programs;
the one or more processors, when the one or more programs are executed by the one or more processors, are caused to:
   present, in a first interface, a first control configured to perform a management setting for a first group,
      wherein the first interface is an interface other than an interface of the first group; and
   complete a corresponding group management setting for the first group in response to an operation for the first control in the first interface,
wherein
   the first interface comprises a team management interface corresponding to a team associated with the first group, the team is associated with a team member set, and the first group comprises at least a part of members of the team member set;
   the first group comprises a user of a first type,
      wherein the user of the first type has management permission for the first group; and
   the method further comprises:
      presenting, upon determining that the first interface comprises the team management interface, at least one of the following in the interface of the first group corresponding to the user of the first type:
         a relation unbinding control configured to unbind an association relation between the first group and the team, and
         a second disbanding control configured to disband the first group; and
      presenting prompt information in response to detecting a trigger operation for the second disbanding control upon determining that the first group is a default communication group of the team, and
         wherein further the prompt information is configured to prompt that the first group is incapable of being disbanded upon determining that the team exists.

11. The electronic device according to claim 10, wherein the one or more processors are further caused to:
present, in the interface of the first group, a second control configured to perform a management setting for the first group; and
complete a corresponding group management setting for the first group in response to an operation for the second control in the interface of the first group;
   wherein a group management setting set corresponding to the first control is the same as a group management setting set corresponding to the second control, or an intersection between a group management setting set corresponding to the first control and a group management setting corresponding to the second control is null, or a group management setting set corresponding to the first control partially overlaps with a group management setting set corresponding to the second control.

12. The electronic device according to claim 10, wherein the first interface belongs to an associated information entity, and
the associated information entity indicates an object having management permission for the first group.

13. The electronic device according to claim 12, wherein the one or more processors are further caused to:
present a third control in the interface of the first group, wherein
the third control is configured to send an approval request to the associated information entity, and
the approval request is configured to request to complete the corresponding group management setting for the first group.

14. The electronic device according to claim 10, wherein the one or more processors are further caused to:
presenting first indication information in the interface of the first group;
wherein the first indication information is configured to indicate that the corresponding group management setting for the first group is capable of being completed by an operation in the first interface.

15. The electronic device according to claim 10, wherein the first control comprises a control associated with a change in group members of the first group.

16. A non-transitory computer-readable storage medium, storing a computer program thereon, wherein the program, when executed by a processor, implements:
presenting, in a first interface, a first control configured to perform a management setting for a first group,
wherein the first interface is an interface other than an interface of the first group; and
completing a corresponding group management setting for the first group in response to an operation for the first control in the first interface,
wherein
the first interface comprises a team management interface corresponding to a team associated with the first group, the team is associated with a team member set, and the first group comprises at least a part of members of the team member set;
the first group comprises a user of a first type, wherein the user of the first type has management permission for the first group; and
the method further comprises:
presenting, upon determining that the first interface comprises the team management interface, at least one of the following in the interface of the first group corresponding to the user of the first type:
a relation unbinding control configured to unbind an association relation between the first group and the team, and
a second disbanding control configured to disband the first group; and
presenting prompt information in response to detecting a trigger operation for the second disbanding control upon determining that the first group is a default communication group of the team, and
wherein further the prompt information is configured to prompt that the first group is incapable of being disbanded upon determining that the team exists.

* * * * *